United States Patent [19]

Ferrell et al.

[11] 4,213,078
[45] Jul. 15, 1980

[54] BATTERY HOLDER AND CONNECTOR FOR A RADIO RECEIVER OR THE LIKE

[75] Inventors: Sherwood W. Ferrell, Rustburg; Friedrich H. Mann; Henry A. Schaefer, both of Lynchburg, all of Va.

[73] Assignee: General Electric Company, Lynchburg, Va.

[21] Appl. No.: 850,553

[22] Filed: Nov. 11, 1977

Related U.S. Application Data

[62] Division of Ser. No. 708,866, Jul. 26, 1976, Pat. No. 4,083,011.

[51] Int. Cl.² .................... H04B 1/034; H01M 10/46
[52] U.S. Cl. ........................................ 320/2; 339/152; 429/100; 455/343
[58] Field of Search ........................................ 320/2–4, 320/25; 325/16, 111, 352; 429/7, 9, 99, 100; 339/152

[56] References Cited

U.S. PATENT DOCUMENTS

| | | |
|---|---|---|
| 2,910,580 | 10/1959 | McCleary . |
| 2,982,807 | 5/1961 | Dassow et al. . |
| 3,070,748 | 12/1962 | Worobey et al. . |
| 3,077,563 | 2/1963 | Combs et al. . |
| 3,305,779 | 2/1967 | Errichiello ........................ 320/4 X |
| 3,413,155 | 11/1968 | Freeman, Sr. . |
| 3,881,961 | 5/1975 | Nation . |
| 3,990,919 | 11/1976 | Krueger . |

*Primary Examiner*—Robert J. Hickey
*Attorney, Agent, or Firm*—James J. Williams

[57] ABSTRACT

An easily assembled battery contact arrangement for a radio is formed of mating parts which can be assembled without tools and fitted into a mating receptacle in the radio. This arrangement includes an opening which accepts the terminal of a chargeable battery, and provides electrical connection to an external projection which permits the battery to be charged while the battery is in the radio.

2 Claims, 13 Drawing Figures

BATTERY HOLDER AND CONNECTOR FOR A RADIO RECEIVER OR THE LIKE

This is a division of application Ser. No. 708,866, filed July 26, 1976, now U.S. Pat. No. 4,083,011.

BACKGROUND OF THE INVENTION

Our invention relates to a battery holder, and particularly to a battery holder and connector for radio receivers or the like.

Radios, particularly receivers of the battery powered type, are useful and desirable because of the fact that the battery permits the radio to be easily operated and carried without the necessity of connecting the radio to a power source, such as 60 hertz alternating current. A requirement of such radios is, of course, that the battery connections to the radio circuit be reliable. Since the batteries should be easily replaced, it is desirable that the connections be made through mechanical parts or contacts as opposed to solder or permanent type connections. And because batteries may leak acid or other corrosive chemicals, the mechanical parts or contacts should also be easily removed and replaced. In particular, it should not be necessary to replace the entire radio case or container. Such easy removal and replacement also provides easy initial assembly. And finally, if the battery is of the rechargeable type, it is desirable that such recharging be possible with the battery positioned in and connected to the radio. If this type of recharging is possible, precaution should be taken to insure that the battery not be connected in reverse, as such a connection would damage or destroy the battery, and might be hazardous to people.

With these problems and conditions in mind, a primary object of our invention is to provide a new and improved battery holder and connector for a radio receiver or the like.

Another object of our invention is to provide a new and improved battery holder and connector that reliably connects the battery to the radio circuit and that insures that batteries of certain physical configurations (such as a nickel cadmium battery) will have the proper polarity relation before the battery can be operably connected to a battery charger.

Another object of our invention is to provide a new and improved holder and connector that can be easily assembled into a radio without tools, and consequently can be easily replaced if damaged by battery chemicals or other substances.

SUMMARY OF THE INVENTION

Briefly, these and other objects are achieved in accordance with our invention by a holder and connector having a cylindrical metallic member in which the battery is positioned. The cylindrical member is removably attached to the radio by a metallic clip. An associated metallic spring serves as a connector to the negative terminal of the radio circuit. The cylindrical member is positioned with one end near an opening in a wall of the radio, and is configured to receive a closure cover or plate which, when the battery is inserted in the cylindrical member, closes the wall opening and connects the negative battery terminal to the cylindrical member and hence to its associated spring connector. The cylindrical member is also provided with a projection that extends through another opening in the wall of the radio for connection to a negative battery charging terminal. A metallic contact is positioned adjacent the other end of the cylindrical member, and is removably attached to the radio by a metallic clip. An associated metallic spring serves as a connector to the positive terminal of the radio circuit. The metallic contact has a projection which extends through another opening in the wall of the radio for connection to a positive battery charging terminal. The metallic contact is configured so that only the positive terminal of certain configurations of batteries (particularly the nickel cadmium type) can engage the projection, thus preventing a battery from being connected to a charger in reverse fashion. The parts of our holder and connector can be mass produced and easily assembled in or removed from a radio without tools.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawng, in which:

DESCRIPTION OF A PREFERRED EMBODIMENT

Figure 1:
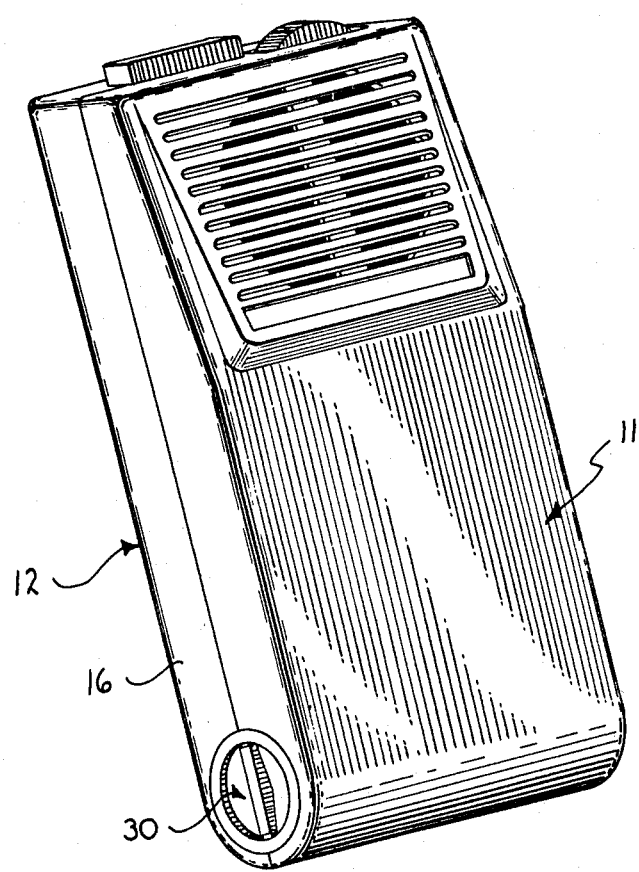
FIG. 1 shows a perspective view of a radio receiver with which our battery holder and connector can be used.

As an illustration of an application for our battery holder and connector, we have selected a small, hand held paging receiver as being typical. However, our battery holder and connector can be used in almost any type of radio or electronic equipment, including transmitters, receivers, or both transmitters and receivers. FIG. 1 shows a perspective view of a small paging receiver which comprises two generally rectangular halves or cases 11, 12 made of plastic or insulating material and arranged to be fitted and held together. The halves 11, 12 hold the parts for the receiver which may include a printed circuit board holding the components, and a loudspeaker. The loudspeaker grill is provided in the upper case 11. Various controls may be provided for operating the radio. Electrical power for the receiver is provided by a battery which typically has a cylindrical shape with a relatively pointed positive terminal at one end and a relatively flat negative terminal at the other end. This battery may be held in and connected to the receiver by our holder and connector. Access to our holder and connector is provided by a generally circular closure plate or cover 30.

Figure 2:
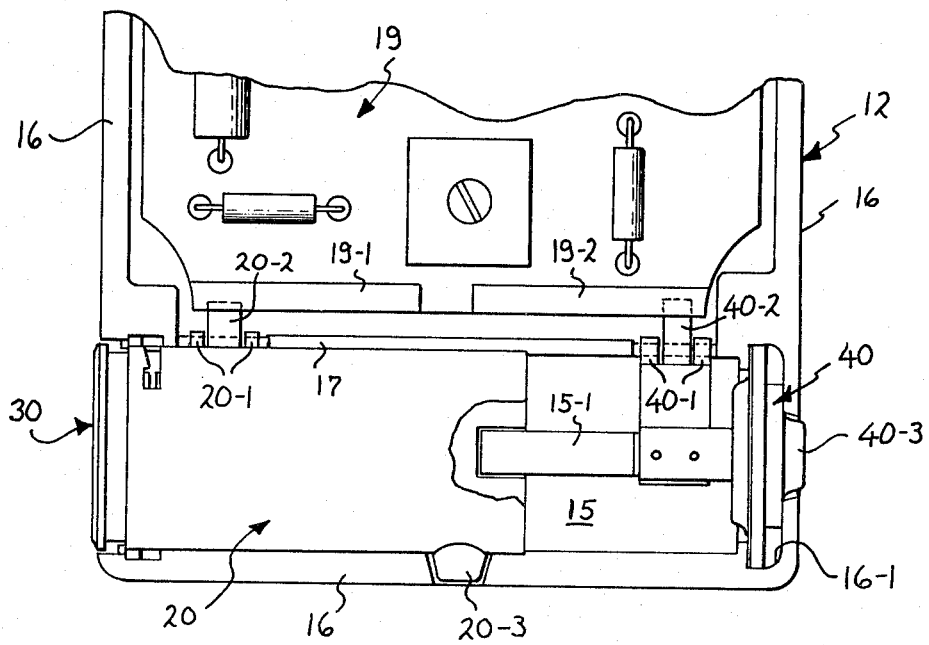
FIG. 2 shows a plan view of a battery holder and connector in accordance with our invention assembled in the radio receiver of FIG. 1.
Figure 3:
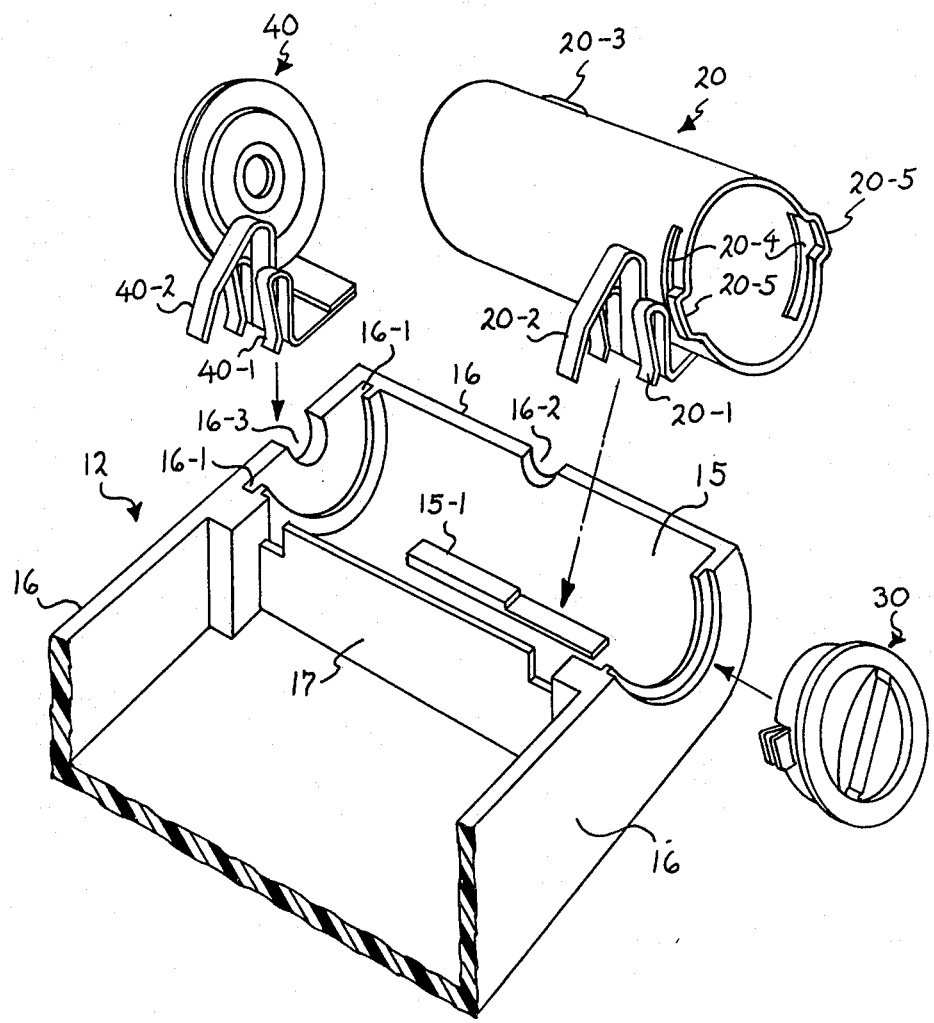
FIG. 3 shows an exploded perspectice view of a battery holder and connector in accordance with our invention.

FIG. 2 shows a plan view of our battery holder and connector for the receiver with the upper cover 11 removed to expose the inside of the lower cover 12, and FIG. 3 shows an exploded perspective view of our holder and connector. The lower cover 12 is formed with a wall portion 16 extending around its periphery or edge, and is provided with a generally semi-cylindrical recess 15 at the lower end. A hollow, metallic cylindrical member 20 is positioned in the recess 15 for receiving a cylindrical battery. The member 20 could have a different cross sectional shape to hold a battery of different shape. The member 20 is removably held in the lower case 12 by two U-shaped, resilient holding clips 20-1 which are attached to the member 20 and which frictionally engage a wall or projection 17 forming the recess 15. A connector spring 20-2 is also attached to the member 20 to connect the member 20 to the radio circuit provided on a printed circuit board 19. This connection is provided through a negative terminal 19-1 which may be a formed copper strip attached to the circuit board 19. Various illustrative components are shown on the board 19. The member 20 is provided with a suitable configuration (described hereinafter) that receives and holds the closure plate or cover 30, so that when the battery is properly positioned in the member 20, the closure plate 30 connects the negative terminal of the battery to the member 20, and thereby connects the battery through the connector spring 20-2 to the negative board terminal 19-1. A generally circular contact 40 is positioned in a short semi-cylindrical recess 16-1 at the end of the recess 15 opposite the cover 30, and spaced from but in alignment with the member 20. When properly positioned, the cover 30, the member 20, and the contact 40 are substantially coaxially aligned along a common longitudinal axis. The contact 40 is provided with two U-shaped, resilient holding clips 40-1 which frictionally engage the recess wall 17. A connector spring 40-2 connects the contact 40 to a positive terminal 19-2 which may be a formed copper strip attached to the circuit board 19. When a battery is properly inserted, its positive terminal engages the contact 40 and is connected through the connector spring 40-2 to the positive terminal 19-2 of the board 19. A metallic charging projection 20-3 is provided on the member 20 and passes through an opening 16-2 in the wall 16 for connection to the negative terminal of a battery charging circuit. Similarly, a metallic charging projection 40-3 is provided on the contact 40 and passes through an opening 16-3 in the wall 16 for connection to the positive terminal of a battery charging circuit.

Figure 4:
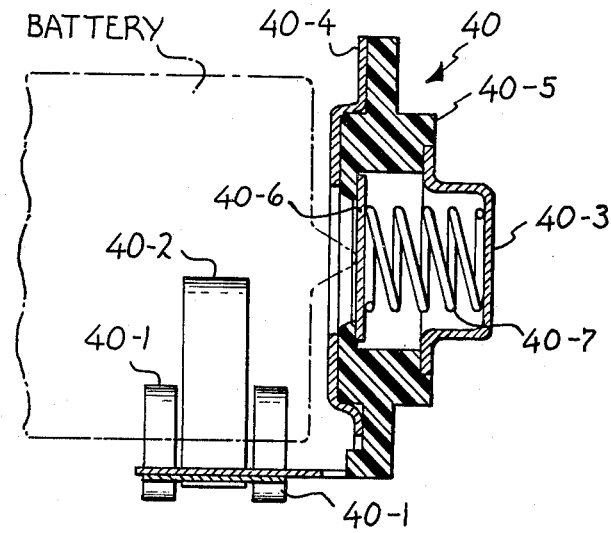
FIG. 4 shows a cross sectional view of a positive contact of our holder and connector.
Figure 5:
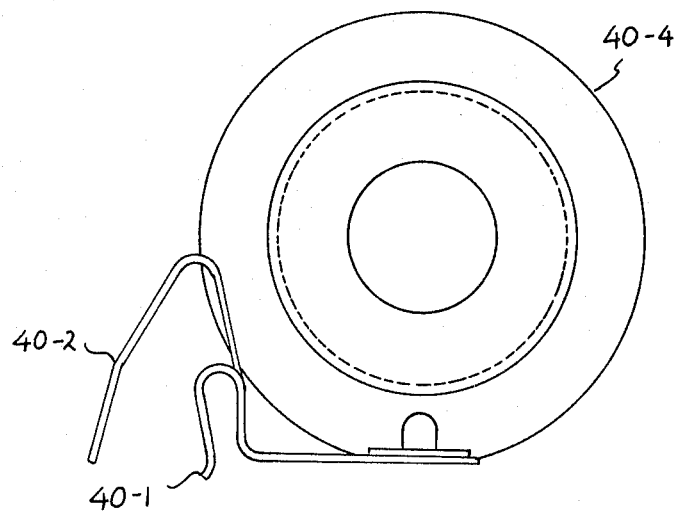
FIGS. 5, 6, 7, and 8 show views of parts forming the positive contact of FIG. 4.
Figure 6:
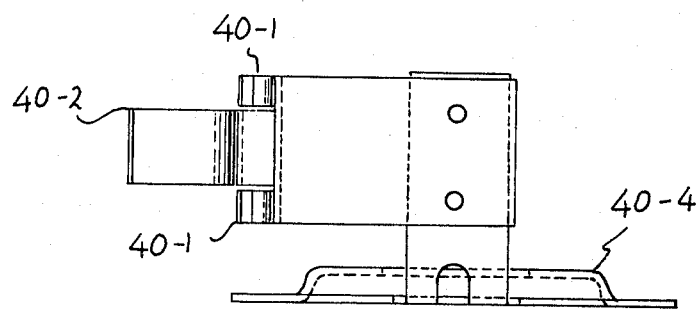
Figure 7:
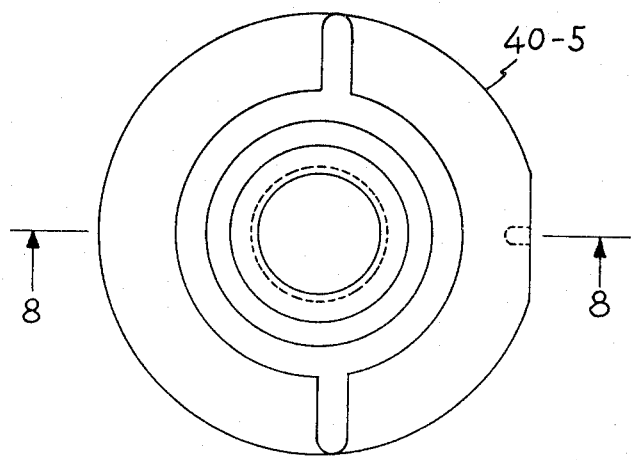
Figure 8:
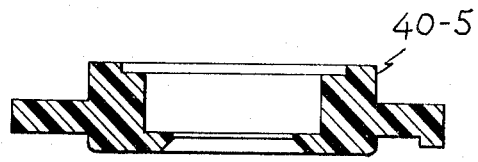
Figure 11:
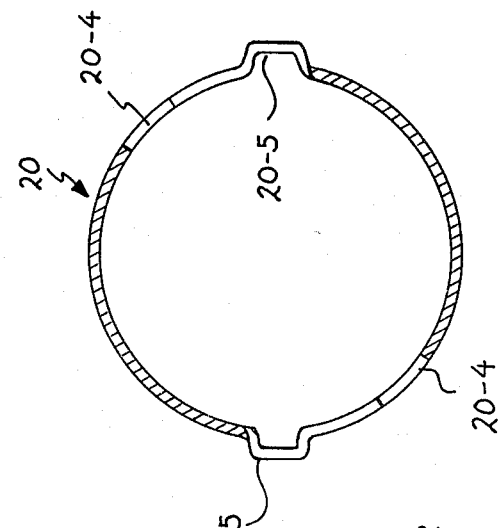
FIGS. 9, 10, and 11 show views of a cylindrical member forming part of a negative contact of our holder and connector.
Figure 10:
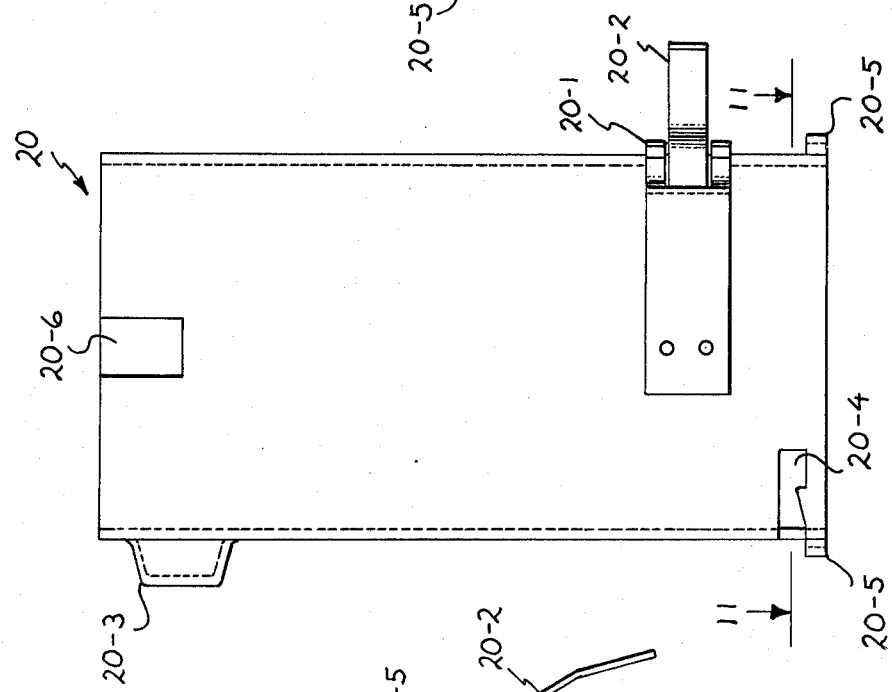
Figure 9:
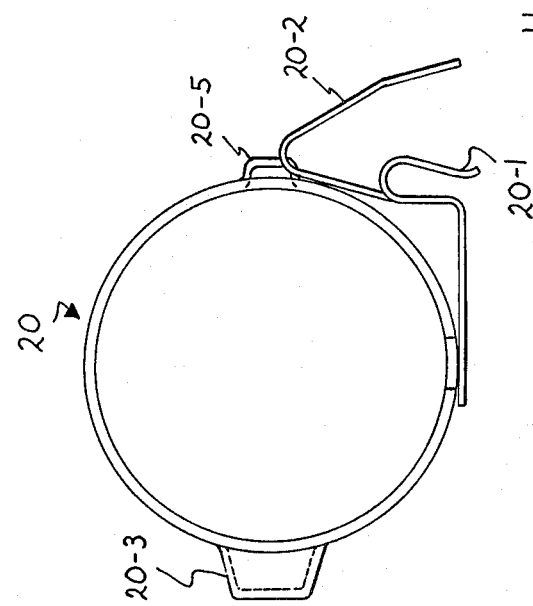

FIG. 4 shows a cross sectional view of the positive contact 40. This contact 40 is comprised of a metallic member 40-4 which is generally circular, and which is punched and shaped as illustrated in detail in FIGS. 5 and 6. A metallic extension is provided at one edge of the member 40-4 to receive and hold (preferably by welding) the holding clips 40-1 and the connector spring 40-2. FIGS. 5 and 6 also show the details of the shape and configuration of the metallic member 40-4, the clips 40-1, and the spring 40-2. The contact 40 also includes an insulating or plastic member 40-5 which is generally circular in shape and configured as shown in detail in FIGS. 7 and 8. A space with an opening is formed in the insulating member 40-5 to receive a metallic charging contact 40-6 which is spring loaded by a metallic spring 40-7 located in the space formed by the member 40-5 and the charging projection 40-3. The spring 40-7 urges the contact 40-6 against the insulating member 40-5 as shown in FIG. 4. As seen in FIG. 4, the thickness of the insulating member 40-5 causes the contact 40-6 to be recessed with respect to the outer face of the member 40-4. Thus, only the positive terminal of a battery of proper configuration (having a center projection as shown in phantom in FIG. 4) can pass through the opening in the insulating member 40-5 to engage the charging contact 40-6 and provide the battery with an external connection through the charging projection 40-3. If a battery of the improper configuration (such as the flat negative terminal of a battery) is inserted into our holder against the contact 40, that configuration will not engage the recessed charging contact 40-6, so that a battery cannot be improperly connected to a battery charger. When the battery is properly and completely inserted, its positive terminal also engages the metallic member 40-4. (Under this condition, the spring 40-7 is compressed.) This member 40-4 is connected through the attached connector spring 40-2 to connect the positive terminal of the battery to the positive terminal 19-2 on the circuit board 19.

The positive contact 40 is easily assembled by placing the insulating member 40-5 against the metallic member 40-4 as shown in FIG. 4. The contact 40-6 is placed in the opening in the insulating member 40-5, the spring 40-7 placed on top of the contact 40-6, and the charging projection 40-3 placed against the spring 40-7 and on the insulating member 40-5. This assembly can be held by a person's fingers, and placed in the semi-cylindrical groove or recess 16-1 formed in the wall 16 of the lower case 12 as shown in FIG. 3. This semi-cylindrical groove 16-1 holds the parts in assembled relation. The holding clips 40-1 can be properly engaged on the recess wall 17 so that the contact 40 is held in the proper arrangement or relation within the lower case 12. The upper case 11 has suitable configurations to receive and hold the contact 40.

The cylindrical member 20 is formed and shaped of suitable metal, as shown particularly as shown in FIGS. 2, 3, 9, 10, and 11. The holding clips 20-1 and the connector spring 20-2 are fastened (preferably by welding) to the member 20 near the one end that receives the closure cover 30. At this same one end, diametrically opposed slots 20-4 are provided around opposite portions of the periphery (through respective arcs of about 45 degrees) for receiving latching ears of the closure plate 30 as will be described. These slots 20-4 are accessible through indentations or enlargements 20-5 as will also be explained. With reference to FIGS. 2 and 3, when the member 20 is completed and assembled, it is inserted in the recess 15 so that its holding clips 20-1 fit over and in engagement with the recess wall 17 to firmly hold the member 20 in position. Additional holding or engagement can be provided by an axial slot 20-6 which fits over and around a projection or boss 15-1 at the bottom of the recess 15. Additional holding is also provided by the charging projection 20-3 which passes through the opening 16-2 in the wall 16. The member 20 is connected by the connector spring 20-2 to the negative terminal 19-1 of the circuit board 19.

Figure 13:
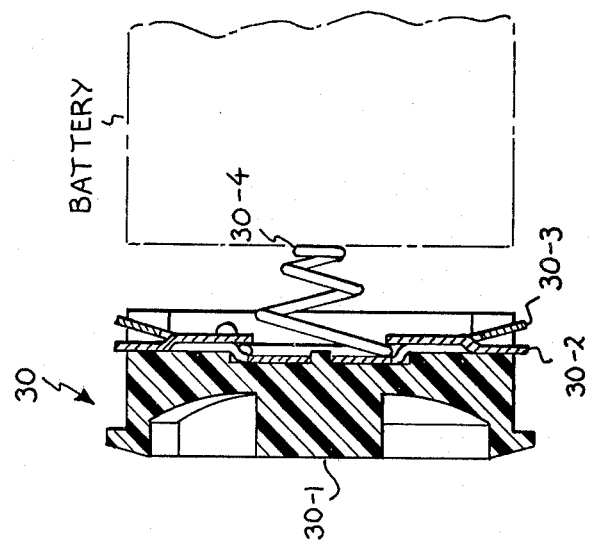
FIGS. 12 and 13 show views of a closure cover or plate of our holder and connector.
Figure 12:
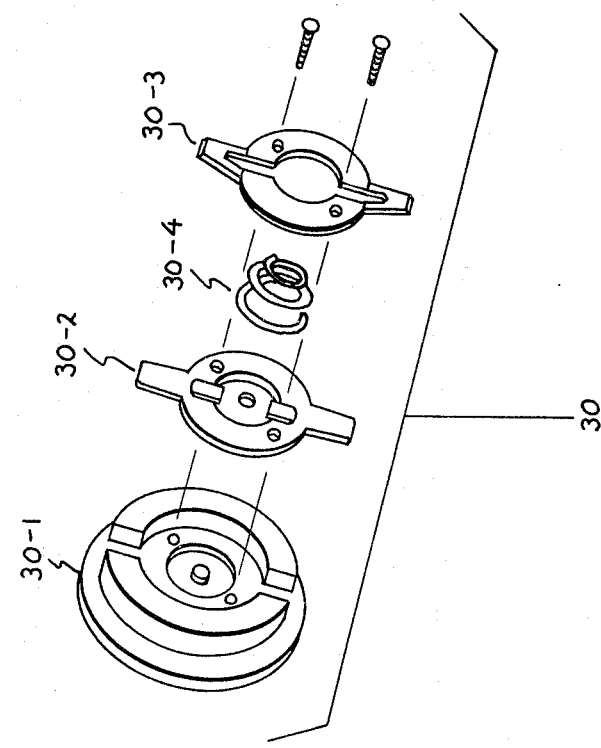

An exploded view of the cover 30 is shown in FIG. 12, and a cross sectional view of the assembled cover 30 is shown in FIG. 13. The cover comprises an insulating or plastic circular cap 30-1. The cap 30-1 is preferably provided with a suitable finger gripping portion (see FIGS. 1 and 3) to facilitate its handling. A metallic latch plate 30-2 is positioned on the inner surface of the cap 30-1, and a metallic helical spring 30-4 is seated within a circular recess in the latch plate 30-2. The spring 30-4 is captivated by having its lower turn pass under two tabs in the latch plate 30-2. A backup spring 30-3 fits around and over the spring 30-4, and the assembly is held together by suitable means such as the self-tapping screws or drive screws shown in FIG. 12. When the assembled cover 30, shown in cross section in FIG. 13, is to be placed into position, the opposed ears or projections of the plate 30-2 and the backup spring 30-3 are positioned to pass through the enlargements 20-5 of the member 20 until these projections hit the walls forming the slots 20-4. The cover 30 is then rotated in the proper direction so that the projections on the latch plate 30-2 and the backup spring 30-3 pass circumferentially around or through the slots 20-4 until they reach the end of the slots 20-4. If the battery has been positioned in the cylindrical member, the helical spring 30-4 engages the negative terminal of the battery as indicated in FIG. 13, and electrical connection is provided from this helical spring 30-4 and its engagement with the battery through the latch plate 30-2 and the backup spring 30-3 to the cylindrical member 20. (Under this condition, the spring 30-4 is compressed). The cylindrical member 20 is connected through its connector spring 20-2 to the negative terminal 19-1 of the circuit board 19. The cylindrical member 20 is also connected to the charging projection 20-3 to provide a negative charging connection to the battery when in position.

It will thus be seen that we have provided a new and improved battery holder and connector that is easily manufactured by mass production techniques. Most, if not all, of the parts making up our connector can be formed by suitable punching, molding, and riveting operations. These formed parts can be placed in a radio by almost anyone without tools. The member 20 with its attached clips 20-1 and spring 20-2 is easily inserted by hand into the recess 15, and the assembled contact 40 may be held in a person's fingers and inserted in the recess or groove 16-1. The parts are held in position without further equipment, and the upper cover or case 11 (properly configured with recesses, openings and slots) placed in engagement with the lower case 12 to hold our connector firmly in place. The cover 30 can be easily inserted and removed with a person's fingers. With a battery properly inserted in our holder and the cover 30 in place, the battery is firmly held and good connections are provided by the opposing forces exerted by the two springs 30-4, 40-7 which are compressed. Since the assembly of our connector is relatively simple, cleaning or replacement of any needed parts is also relatively simple, and can be done by a relatively unskilled person in the field without the necessity of the radio or connector being returned to a manufacturing facility.

While we have shown only one embodiment of our invention, persons skilled in the art will appreciate the various modifications that may be made to our connector. The various insulating parts can be suitably formed of any desired insulating material. The metallic parts may also be suitably formed of any metallic materials having the desired characteristics, and joined in any suitable fashion. The cover 30 can have more than two ears or projections which would engage appropriate slots in the member 20. In particular, the clips 20-1, 40-1, and springs 20-2, 40-2 should be made of a spring-like or resilient metal. And finally, our connector can be used with almost any type of radio requiring a self-contained battery. Therefore, it is to be understood that modifications may be made without departing from the spirit of our invention or from the scope of the claims.

What we claim as new and desire to secure by Letters Patent of the United States is:

1. In a battery powered radio receiver or the like that requires a battery to be charged while said battery is positioned in said radio receiver or the like, an improved battery contact arrangement for said radio receiver or the like comprising:
   a. a metallic member having an opening therethrough;
   b. an insulating member positioned adjacent said metallic member, said insulating member having a first opening therethrough substantially in alignment with said opening in said metallic member, and said insulating member further having an enlarged opening adjacent to said first opening and located on the side of said first opening away from said metallic member;
   c. a metallic contact positioned in said enlarged opening in said insulating member in the vicinity of said first opening in said insulating member, said metallic contact being larger than said first opening in said insulating member for retention in said enlarged opening in said insulating member;
   d. a metallic spring positioned in said enlarged opening in said insulating member against said metallic contact;
   e. and a metallic charging projection having a contact portion for engaging an external battery charging terminal and having a base portion, said metallic charging projection being positioned with said base portion in contact with said insulating member on the side thereof away from said metallic member and with said contact portion in contact with said spring, and said metallic charging projection holding said spring in said enlarged opening in said insulating member between said metallic contact and said contact portion of said charging projection.

2. The battery contact arrangement of claim 1 wherein said opening in said metallic member and said opening in said insulating member are aligned and large enough to permit passage of the terminal of a chargeable battery to engage said metallic contact for charging, and wherein said metallic contact is spaced from said metallic member to prevent engagement thereof by the terminal of a nonchargeable battery, whereby both batteries can engage said metallic member for operating said radio receiver or the like.

* * * * *